United States Patent Office.

DR. CHARLES SEIDEL, OF NEW YORK, N. Y.

Letters Patent No. 76,107, dated March 31, 1868.

---

IMPROVED VEGETABLE COLORING-MATTER.

---

*The Schedule referred to in these Letters Patent and making part of the same.*

---

TO ALL WHOM IT MAY CONCERN:

Be it known that I, Dr. CHARLES SEIDEL, of the city, county, and State of New York, have invented a new and useful Indelible Vegetable Fluid; and do hereby declare that the following is a full and exact description thereof, the nature of which consists in a new combination of matter, of which the cashew-nut (or "anacardia nut," as sometimes so called,) forms the basis, and when dissolved by aid of essential oils, such as oil of turpentine, or its equivalent, as a menstruum solvent, or by benzine, chloroform, or bisulphuret of carbon, produces an indelible vegetable fluid for writing or printing on clothes, paper, or parchment, and for cancelling revenue-stamps, and like purposes, which cannot be defaced or destroyed by the counteraction of acids or reagents, as the fluid becomes a component part of the material on which it is used.

To enable others skilled in the art to make and use my invention, I will further explain its properties and manufacture.

It is well-known that the cashew-nut, during the season of vegetation, produces a pigment or dark color, which is again lost after the season of vegetation is over, rendering the nut worthless, (so far as extracting the color is concerned,) and in reproducing this pigment, by a proper menstruum solvent, I have obtained the desideratum, and a basis for the aforesaid fluid.

The cashew-nuts I place in a suitable vessel, break them open, and free them from the pith or oleaginous interior. I next place the nuts in a mortar, and reduce the same to powder, and, with the nuts so prepared, I mix oil of turpentine, or its equivalent, as a menstruum solvent, and I remove all foreign matter from the fluid by filtration, (and reduce the same to an extract, as may be desired,) the color and consistency varying with the proportions of the ingredients, and the coloring character derived from the cashew-nut; and thus I produce an indelible vegetable fluid for writing or printing on clothes, paper, or parchment, and for cancelling revenue-stamps, that cannot be destroyed by alkali or reagents.

I would remark that the paper or clothes to be written on require no sizing or other preparation than an ordinary smooth surface, and, for use of the fluid, a clean steel pen; but, should it be desired to give the writing or printing a very black color, a little lamp-black may be added to the consistency, and, although when used on cloth, may become lighter on washing, it will be again restored to its original shade by the use of alkali, either in soap while washing, in solution, or as a component part of the mixture previous to use.

Having described my invention, what I claim, and desire to secure by Letters Patent, is—

An indelible vegetable fluid, having for its basis the pigment of the cashew-nut, as a new combination of matter, substantially as and for the purposes described and set forth.

In testimony whereof, I have hereunto set my signature.

DR. CHS. SEIDEL.

Witnesses:
A. O'NEILL,
I. F. ROBERTS.